United States Patent [19]

Band et al.

[11] Patent Number: 4,741,112

[45] Date of Patent: May 3, 1988

[54] MEASURING MACHINE WITH THIN STEEL PLATE CLADDING

[75] Inventors: Gerhard Band; Günter Berger; Günther Ross, all of Oberndorf, Fed. Rep. of Germany

[73] Assignee: Mauser-Werke Oberndorf GmbH, Fed. Rep. of Germany

[21] Appl. No.: 936,184

[22] Filed: Dec. 1, 1986

[30] Foreign Application Priority Data

Dec. 4, 1985 [DE] Fed. Rep. of Germany ....... 3542766

[51] Int. Cl.⁴ .............................................. G01B 5/00
[52] U.S. Cl. ..................................... 33/503; 33/1 M; 73/431; 220/400; 220/DIG. 9
[58] Field of Search ............... 73/431, 865.6; 374/208; 493/903; 220/469, DIG. 9, 400; 150/52 R; 33/1 M, 503, 125 T

[56] References Cited

U.S. PATENT DOCUMENTS

| | | | |
|---|---|---|---|
| 565,013 | 8/1896 | Moodie | 220/400 X |
| 1,734,209 | 11/1929 | Huffine | 220/DIG. 9 |
| 2,520,972 | 9/1950 | Siple | 220/400 X |
| 4,313,345 | 2/1982 | Abele | 73/431 |
| 4,466,190 | 8/1984 | Ross et al. | 33/503 X |

*Primary Examiner*—William D. Martin, Jr.
*Attorney, Agent, or Firm*—McGlew and Tuttle

[57] ABSTRACT

A coordinate measuring machine has supporting members movable in a plurality of coordinate directions which are each made of welded steel construction. Surfaces of the supporting members are covered by sheet metal shells which are spaced by a small distance away from the supporting members and form an air space thereover. This reduces the adverse influences of temperature induced expansions and contractions.

8 Claims, 5 Drawing Sheets

MEASURING MACHINE WITH THIN STEEL PLATE CLADDING

FIELD AND BACKGROUND OF THE INVENTION

The present invention relates in general to measuring machines, and in particular to a new and useful coordinate measureing machine made of welded steel construction and being at least partly clad in thin sheet metal shells which are spaced outwardly from the welded steel construction.

Measuring machines of the welded steel construction are known in themselves. Thus, for example, in German Pat. No. 3125681, a coordinate measuring machine is described in which the supporting base frame is formed by a welded construction on which a transverse boom carrying a spindle sleeve is movable along a steel track. The base frame of this known coordinate measuring machine consists of a resin-concrete shape in which steel tracks are inserted. The composition of the resin-concrete is chosen so that its coefficient of thermal expansion approximately corresponds to that of the adjacent steel tracks.

Now it is known that temperature fluctuations from the environment, in particular in the workshop area, very essentially affect the accuracy of measuring devices. This is true especially for coordinate measuring machines because the overall size of such machines offers large active contact surfaces.

SUMMARY OF THE INVENTION

It is an object of the present invention to avoid or at least to diminish the negative temperature influence on the supporting members of the kinds of measuring machines mentioned above.

According to the invention, the problem of temperature influence is solved in that the supporting members responsible for the movement in the coordinate directions are provided with a skin or shell that is spaced from and peripheral to the members at least in the lengthwise direction.

The shell may be formed by a steel plate that is thinner than the supporting members. Naturally also materials other than steel may be chosen for the shell in accordance with this invention.

It is critical to this invention that no bimetal effects occur which would change the geometry and the fixed zero or null point of the machine. This is achieved by the invention in that the sheeting is applied at a small distance from the carrying walls of the members, in order that a temperature shield will normalize the temperature difference and so that any length variation will be compensated for between the shield and the members.

As a variant of the invention, the shell can be held by welded-in bars or bolts at a uniform distance above the welded steel construction of the measuring machine. the distance between the shell and the supporting member is small.

According to the invention, all structural parts are encased, in order that the temperature balance within the measuring machine is largely normalized and unilateral temperature transfers cannot change the geometry of the measuring machine. In a special development of the invention, in a measuring machine, in particular a coordinate measuring machine, with a base frame with columns connected in L-shaped form, with an abutment resting on the columns, as well as with a cross beam projecting over the measuring table and connected with the external supporting arm, the spindle sleeve with the measuring head being supported by this cross beam, the shell casing may be chosen so that at its four vertical outer sides the support arm is provided with a shell spaced from the outer sides, that the abutment has at its lower long side a spaced shell and that the cross beam is equipped on its underside and on the outer long sides with a spaced shell.

Further, the space between the shell and the supporting members may be filled with thermo-insulating material.

For design reasons it is necessary to form with the respective sheetmetal thickness very stable (sturdy) columns and a light-weight support arm. In order that the columns and the support arm will make the same expansion in the corresponding time axis, the support arm is, according to the invention, provided on the outer side with the thin shell at a predetermined small distance and consisting of the same material as the supporting member. Thereby direct contact of the carrying support arm construction with the ambient temperature is prevented and the expansion behavior is adapted to the columns to a large extent. Advantageously, these measures mainly avoid the height error on the Z-axis and angle errors in the XZ and YZ axes, that are due to temperature variation. According to the aforesaid features of the invention, the abutment is cased only from below with a thin plate at the predetermined distance. Hence the same conditions prevail as apply for the base frame. At the cross beam similar conditions exist as in the abutment. Here, according to the invention, in addition to the underside, also the inner side and the outer side of the beam are encased with thin plates at the predetermined distance. Thereby the height error in the Z direction and again an angle deviation in the XY-and in the XZ-direction are avoided.

As all structural parts and the spindle sleeve are made of steel, this type of temperature compensation can be carried out especially well. The shells applied at certain distances from the structural parts create a cavity, which remains empty as a rule. According to the invention, however, if needed, an insulating filling material can be put in.

Accordingly a further object of the present invention is to provide a measuring machine, in particular a coordinate measuring machine having supporting members movable in a plurality of coordinate directions and each made of welded steel construction, comprising an outer skin or shell which is made of thin sheet metal and which is spaced by a small distance away from the outer surfaces of the supporting members to permit even expansion and contraction of the supporting members under the influence of temperature changes.

A still further object of the invention is to provide a measuring machine which is simple in design, rugged in construction and economical to manufacture, and which is not susceptable to thermal disturbances.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
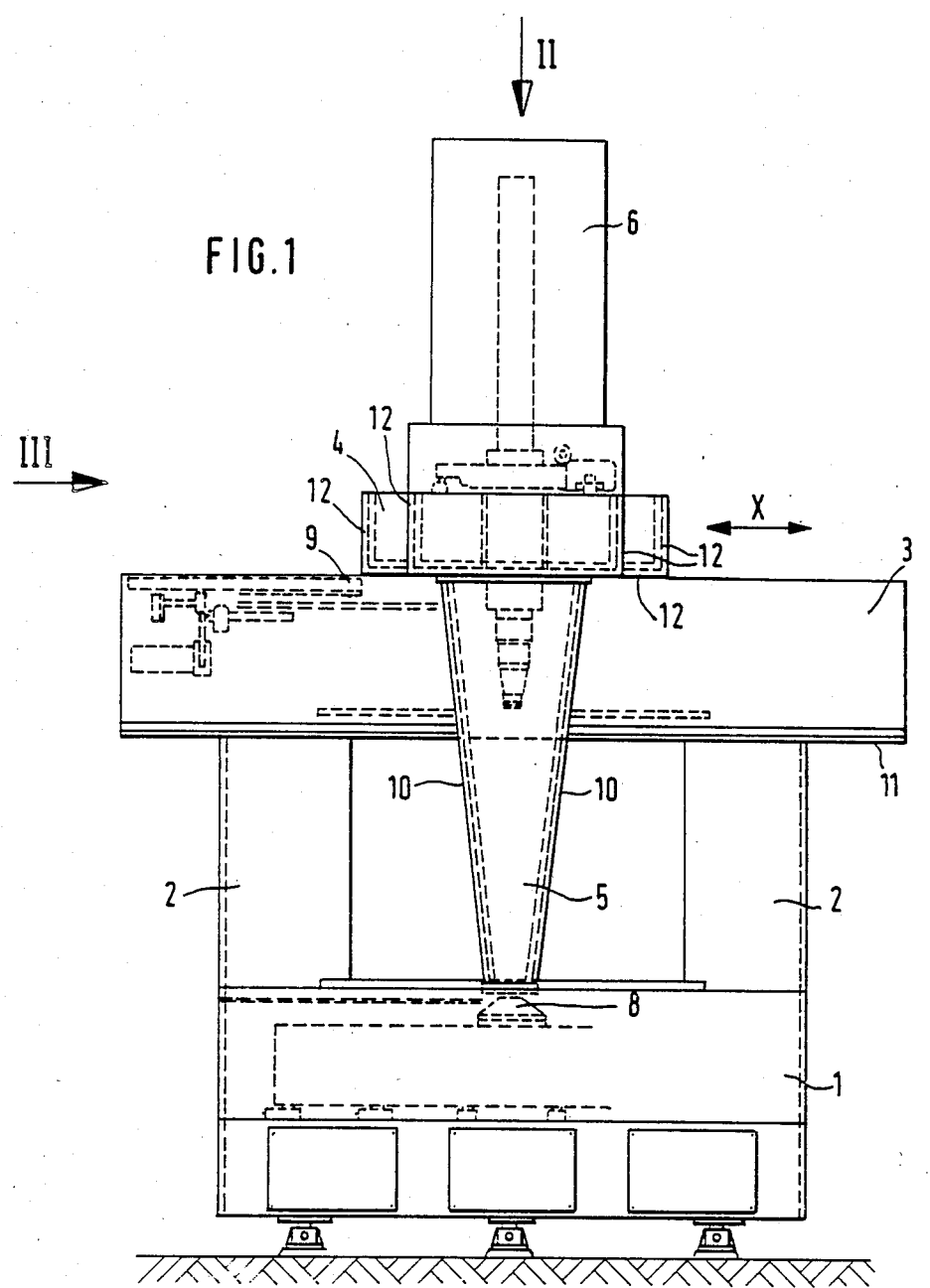
FIG. 1 is a front elevational view of a coordinate measuring machine with the skin or shell according to the invention at the supporting members.
Figure 2:
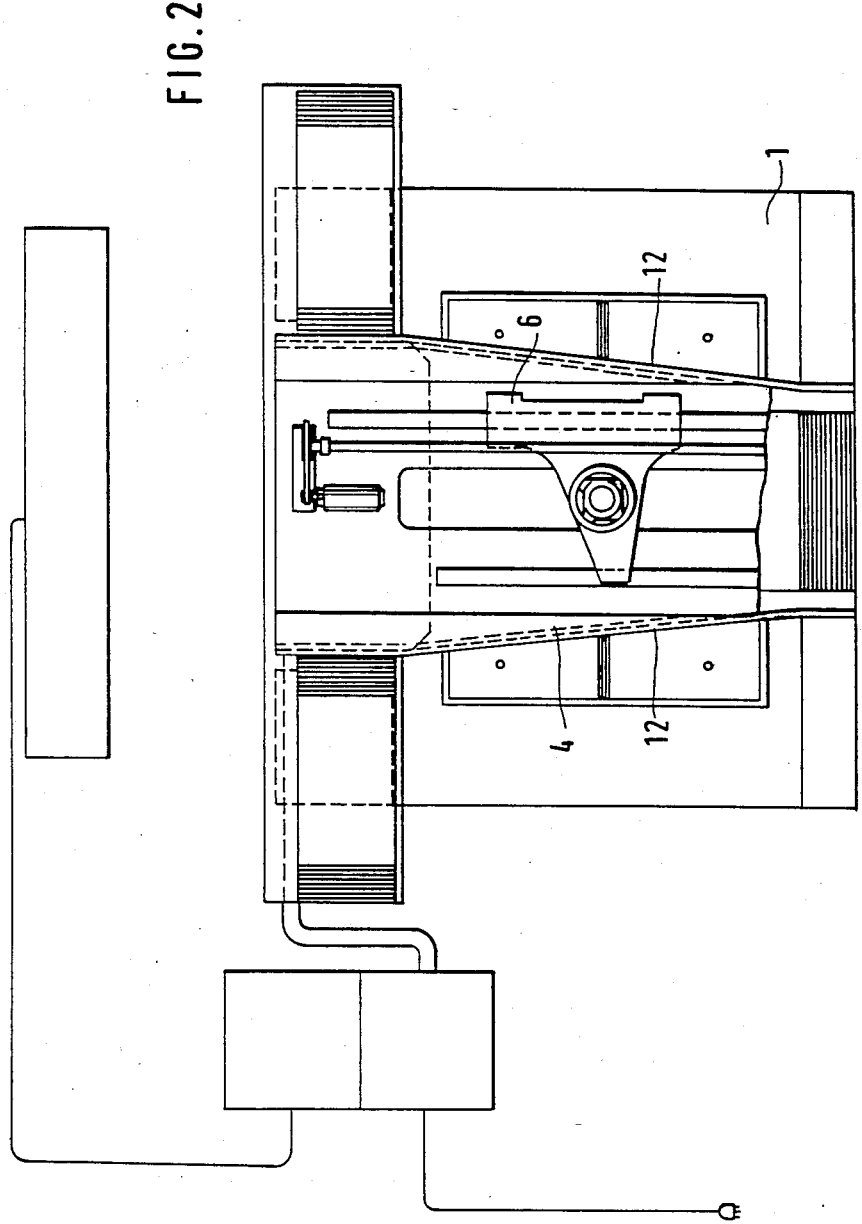
FIG. 2 is a top plan view of the coordinate measuring machine taken at arrow II in FIG. 1.
Figure 3:
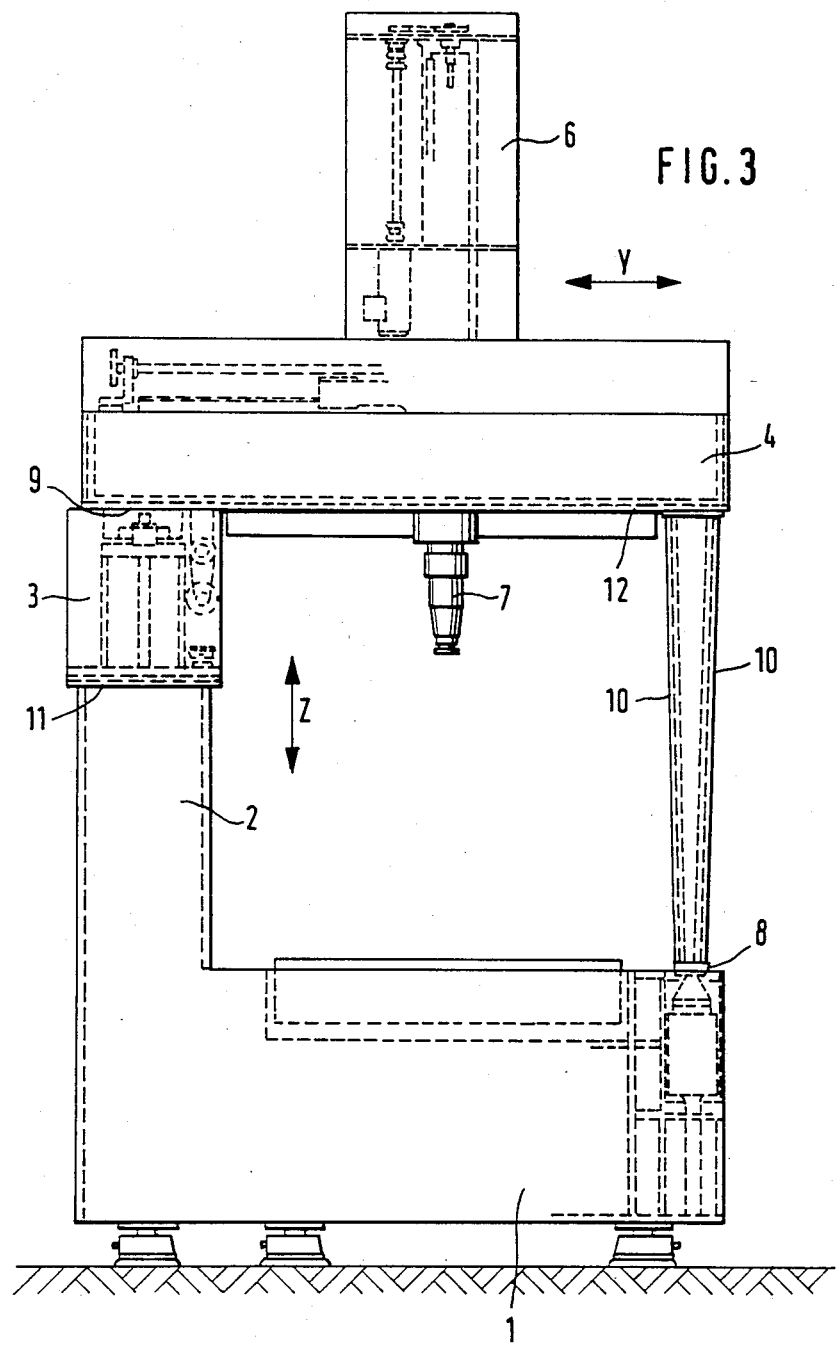
FIG. 3 is a view of the coordinate measuring machine according to FIG. 1 taken at arrow III.

The coordinate measuring machine according to FIGS. 1 to 3 comprises a base frame 1, to which are connected two columns 2 to form an L-shape as seen in FIG. 3. Above the two columns 2 is an abutment 3 in the form of a portal. On the abutment 3 and at right angles to the longitudinal direction thereof, a cross beam 4 is arranged, which by its front end is supported on a support arm 5 and is movable lengthwise to the abutment 3 (arrow X). The cross beam 4 receives and carries a spindle sleeve holder 6, in which a spindle sleeve 7 is displaceable in the Z-direction. In the base frame 1 and in the abutment 3, guides or tracks 8 and 9 of hardened steel are provided.

The movement of the spindle sleeve 7 in the Z-direction occurs within the spindle sleeve holder 6. Movement of the spindle sleeve 7 in the X-direction occurs by movement of the cross beam 4 jointly with the support arm 5 along the tracks 8 and 9. Lastly, the movement of the spindle sleeve 7 in the Y-direction occurs along a track of cross beam 4 (FIG. 2) in which the spindle sleeve 7 together with the spindle sleeve holder 6 is movable.

The parts of the coordinate measuring machine which carry and which are responsible for the movement in the coordinate directions, namely the base frame 1, the columns 2, the abutment 3, the cross beam 4 and the support arm 5, are assembled in a welded steel construction, the base frame 1 forming at the same time also the measuring table.

Since temperature fluctuations from the environment, in particular in the workshop area, greatly influence the uncertainty in measurements for the measuring machines, simple but very effective measures have been taken in the coordinate measuring machine for reducing the temperature influence on the supporting members. In all the measures described in the following, it is essential that no bimetal effects occur which could alter the geometry and the fixed zero or null point of the machine.

As can be seen in FIGS. 1 to 3, the support arm 5 is provided on its four outer sides with a relatively thin skin or shell 10, which is at a small distance from the welded steel construction of the support arm 5. This shell 10 is made of the same material as the welded steel construction of the support arm 5, thus avoiding any bimetal warping. By this shell 10 direct contact of the carrying support arm construction with the ambient temperature is prevented, whereby the expansion behavior of the support arm 5 is adapted to the columns 2 to a large extent. Further, by these measures, above all, the height error in the Z-axis direction and the angle errors in the YZ-and in the XZ-direction due to temperature change, are avoided.

Upon change of temperature, the abutment 3 with the X-principal guide is influenced from below by lengthwise expansion. From the side and also from above a closed covering is applied. The coordinate measuring machine is altered in the Z-height and in the angle XY.

By facing abutment 3 with a shell 11 made of thin sheetmetal and being at a certain distance from the welded steel construction of the abutment 3, the temperature adaptation time is stretched, so that approximately the same conditions as in the base frame prevail and deformations can occur.

At the cross beam 4 the conditions are similar as at the abutment 3. Here in addition to the underside also the inner side and the outer side are provided with a shell 12 of thin sheetmetal and at the predetermined distance from the welded steel construction of the cross beam 4. Thereby the height error in the Z-direction and also an angle deviation in the direction XY and XZ, is avoided.

As all structural parts and also the spindle sleeve 7 are made of steel, the aforesaid type of temperature compensation is especially well realizable. On the whole, therefore, an excellent temperature compensation occurs, the deformations of the carrying members are substantially reduced, and there is observable now only a uniform expansion of the carrying members.

Figure 4:
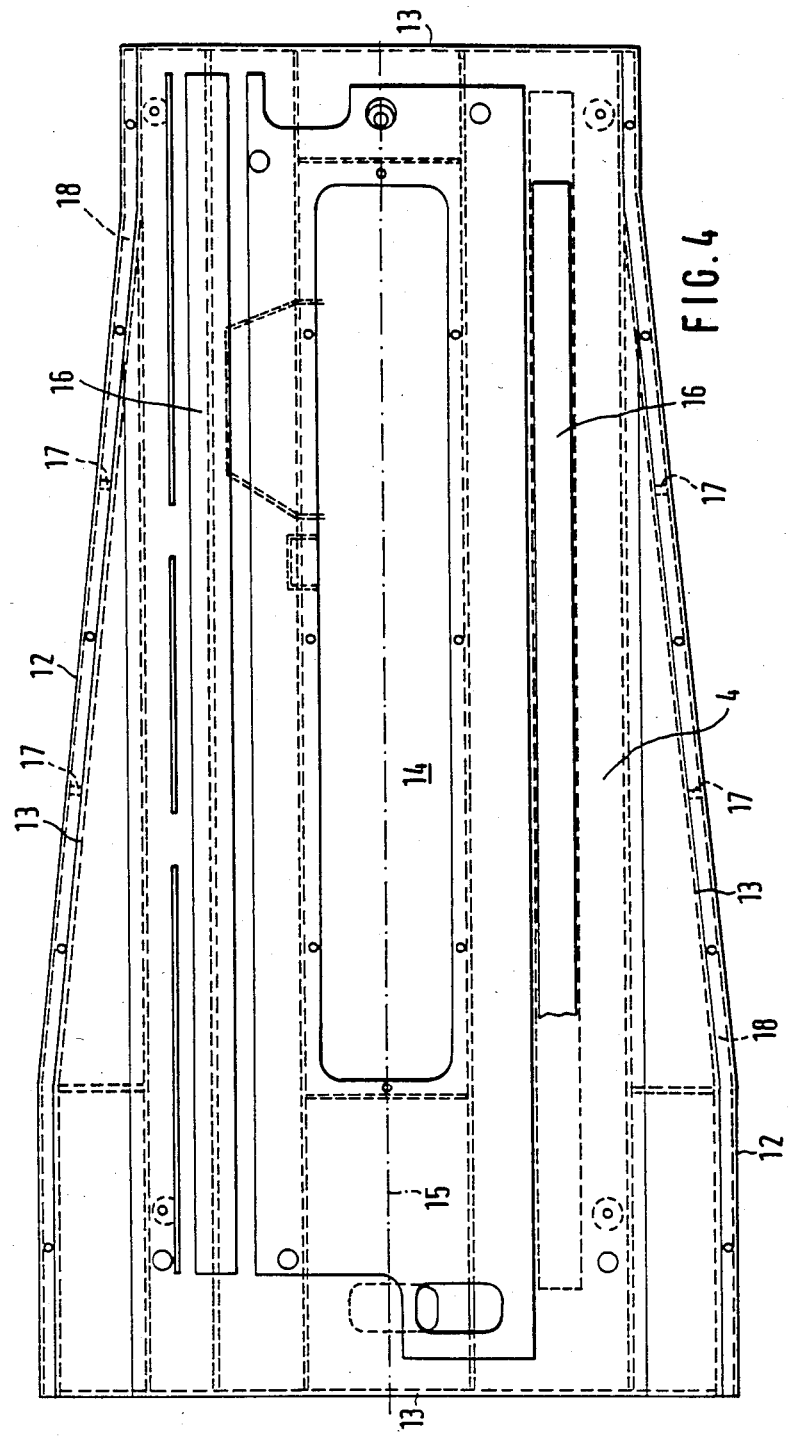
FIG. 4 is a plan view of the cross beam of the coordinate measuring machine of FIG. 1.
Figure 5:
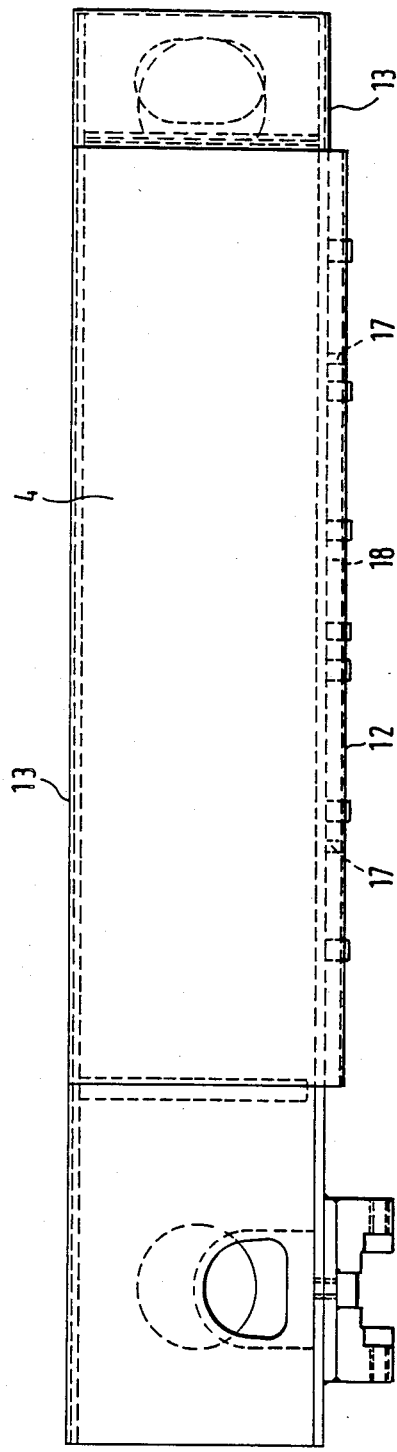
FIG. 5 is a side view of the cross beam of the coordinate measuring machine of FIG. 1.

In FIGS. 4 and 5, the construction of the temperaturecompensating shell at the cross beam 4 is illustrated by way of example. As the construction for the shell resemble those in the other structural parts, it is not necessary to discuss them in detail. Visible in the top view of the cross beam 4 in FIG. 4, is the contour of the basic welded steel construction 13. The spindle sleeve 7 is movable inside a recess 14 via the spindle sleeve holder 6 on an axis 15, which represents at the same time the Y-direction for the coordinate measuring machine. For the purpose of the displacement of the spindle sleeve 7, the spindle sleeve holder 6 slides on the tracks 16 on either side of the recess 14 in the cross beam 4. The shell 12 is now applied at a predetermined small distance from the welded steel construction 13 of the cross beam 4.

The uniform distance of the shell 12 from the welded steel construction 13 is effected by spacer bolts 17, which are welded to the welded steel construction 13 as well as to the shell 12. In the shown example of FIGS. 4 and 5, the cavity 18 thus formed between the shell 12 and the welded steel construction 13 is empty (except for air). If necessary, an insulating filler material, e.g. of plastic, can be introduced here.

It is noted that the supporting members 3, 4 and 5 are made of welded steel construction, in particular from sheet metal plates which are thicker than the relatively thin sheet metal skin or shell 10, 11 and 12.

While a specific embodiment of the invention has been shown and described in detail to illustrate the application of the principles of the invention, it will be understood that the invention may be embodied otherwise without departing from such principles.

What is claimed is:

1. A measuring machine comprising an abutment, at least one supporting member movably mounted to said abutment for movement in a coordinate direction, said abutment and said supporting member being made of welded steel construction and having elongate surface portions, and a thin shell covering at least some of said elongate surface portions, and spaced away from said elongate surface portions, to define a space with said elongate surface portions, thereby to extend at least longitudinally of said abutment and said supporting member.

2. A measuring machine according to claim 1, wherein said welded steel construction is made of thin sheet metal, said shell being made of thinner sheet metal.

3. A measuring machine according to claim 1, including spacers fixed between said shell and said surfaces of said supporting member and said surfaces of said abutment to hold said shell at uniform distances from said surfaces.

4. A measuring machine according to claim 1, including a thermal insulating material filling said space between said shell and said surfaces.

5. A measuring machine according to claim 1, wherein said measuring machine comprises a coordinate measuring machine having a base frame forming a table, at least one column extending upwardly from said base frame and forming an L-shaped configuration with said base frame, said abutment being mounted on said at least one column, said suppporting member comprising a cross beam mounted for linear movement in a first coordinate diection along said abutment and over said table, a spindle sleeve mounted for movement in a second coordinate direction along said cross beam, said first and second coordinate directions being perpendicular to each other, a support arm connected to said cross beam and slidably engaged with a portion of said base frame spaced away from said abutment for movement of said cross beam in said first coordinate direction, said elongate surface portion of said abutment being a lower surface portion extending in the first coordinate direction, said cross beam having an elongate lower surface portion and elongate, oppositely directed surface portions extending in the second coordinate direction and said supporting arm having elongate side surface portions extending around its periphery, said shell extending over and being spaced from said lower surface portion of said abutment, said lower and said side surface portions of said cross beam and said side surface portions of said support arm.

6. A measuring machine, in particular a coordinate measuring machine made of welded steel construction, comprising a plurality of supporting members movable in a plurality of coordinate directions, each covered with a thin skin of sheet metal which is spaced at a small distance from selected surface portions of said supporting members and which at least extend in a length direction of each supporting member thereby to shield said surface portions from ambient temperature changes to ensure a uniform rate of change in temperature and an even thermal expansion and contraction of the supporting members throughout the machine.

7. A coordinate measuring machine comprising a frame and a supporting member mounted on the frame each having components extending in the coordinate directions, the frame components and supporting member components which extend in the same coordinate directions being located in spaced apart side-by-side relation and being of different cross-sectional size such that their respective adjacent surface portions have different heating and cooling rates in response to ambient temperature changes, a thin sheet-form cover located adjacent and spaced from the surface portions having the higher heating and cooling rates, shielding those surface portions from ambient temperature changes to lower their rates of temperature change thereby to even the heating and cooling rates of the components of the frame and the supporting member which extend in the same coordinate directions so that they maintain the same dimensions as each other in the coordinate directions during changes in ambient temperature.

8. A coordinate measuring machine according to claim 7 in which the cover is so located that the rates of temperature change of all the frame and supporting member components in response to ambient temperature changes are substantially the same.

* * * * *